US006520590B2

United States Patent
Feuereisen Azocar (10) Patent No.: US 6,520,590 B2
(45) Date of Patent: Feb. 18, 2003

(54) ELASTICALLY DEFORMABLE TRUCK BED HOPPER FOR MINING DUMP TRUCK OF FRONTAL WALL, PROTECTIVE BLINDER AND BOTTOM OF CURVED SURFACES

(75) Inventor: Alberto Cristian Feuereisen Azocar, 7870 Simon Bolivar, La Roma, Santiago (CL)

(73) Assignees: Alberto Cristian Feuereisen Azocar, Santiago (CL); Diesel Machinery International Corporation, Miami, FL (US)

( * ) Notice: Subject to any disclaimer, the term of this patent is extended or adjusted under 35 U.S.C. 154(b) by 0 days.

(21) Appl. No.: 09/911,958

(22) Filed: Jul. 24, 2001

(65) Prior Publication Data

US 2002/0074848 A1 Jun. 20, 2002

(30) Foreign Application Priority Data

Dec. 18, 2000 (CL) .......................................... 3486-2000

(51) Int. Cl.$^7$ ................................................. B60P 1/00
(52) U.S. Cl. .............................. 298/24; 298/7; 296/184
(58) Field of Search ............................ 298/24, 7, 17 R; 296/184; 105/247, 254

(56) References Cited

U.S. PATENT DOCUMENTS

| 2,490,532 | A | * | 12/1949 | Maxon, Jr. | |
| 3,139,286 | A | * | 6/1964 | Johnson | 298/24 |
| 3,413,032 | A | * | 11/1968 | Dendy | 298/24 |
| 3,814,479 | A | | 6/1974 | Vornberger | |
| 4,531,781 | A | * | 7/1985 | Hunt et al. | 298/22 P |
| 4,678,235 | A | * | 7/1987 | Hagenbuch | 298/23 DF |
| 6,022,068 | A | | 2/2000 | D'Amico | 298/23 M |

\* cited by examiner

Primary Examiner—Stephen T. Gordon
(74) Attorney, Agent, or Firm—Ladas & Parry

(57) ABSTRACT

A truck bed hopper of a mining dump truck that is capable of elastic deformation when it is subject to the loading or unloading of material, built preferably of structural or of wear and tear steel, where the general structure of the bed hopper is curved. By this construction, the great moments of inertia which are achieved with curved surfaces eliminate or reduce to a great extent the use of beams as main resistive elements. The present bed hopper has a protective blinder which is preferably cylindrical in shape and a frontal wall and floor which are preferably elliptical in shape. The bottom of the bed hopper externally has a plurality of transversal beams, preferably 4 to 6 in number, even more preferably 5 in number which have a main function of keeping the bottom surface curved and transferring the strengths of the envelopment to the truck's body. Further, the bottom externally also has a plurality of support elements, preferably two in number, that are located at the front part, i.e., ahead of the rotation axis of the hopper. The support elements only permit the support of the bed hopper on the truck's body and may be eliminated if the truck's body adapts itself to directly take in the transversal beams.

10 Claims, 10 Drawing Sheets

ELASTICALLY DEFORMABLE TRUCK BED HOPPER FOR MINING DUMP TRUCK OF FRONTAL WALL, PROTECTIVE BLINDER AND BOTTOM OF CURVED SURFACES

BACKGROUND OF THE INVENTION

1. Field of the Invention

The present invention relates to bed hoppers to be used in mining dump trucks of high, medium or low tonnage, and more specifically to a bed hopper built with curved surfaces in its bottom, frontal zone and protective blinder, thus eliminating the need to install beams in the frontal zone and blinder, and substantially decreasing the number of beams in the bottom of the bed hopper.

2. Statement of the Problem

Mining hoppers in present use are built with materials that are arranged to form flat surfaces at the blinder, lateral and frontal walls, and floor, which are reinforced by longitudinal external beams, transversal beams or a combination of several longitudinal and transversal beams. These beams provide rigidity to the flat sheets that form the hopper. In the previous art, the moments of inertia necessary to offer resistance to the stresses generated by the load, are provided by the beams. This type of construction diminishes the capacity of elastic deformation of the hopper and makes the same more brittle or less resistant to abrasion, and less resistant to impact.

In mining hopper in present use, the materials used to construct the protective blinder are also arranged to generate flat surfaces. In this manner, the blinder is supported by a group of longitudinal beams. The frontal wall of the hopper is also built in such a way as to generate a flat surface that is supported by vertical and horizontal beams, or a combination of the same, to offer resistance to the stresses that the load generates on said part. The bottom structure of the hopper is constructed in the same manner with material that is arranged to form a flat surface that is supported by longitudinal and transversal beams welded one to another.

It is well known by those skilled in the art, that "U" profiles are normally employed as structural beams in the manufacture of hoppers for mining trucks, as opposed to "T" beams or double "T" beams, which reveal little capacity and resistance to torsion stresses.

Specifically, U.S. Pat. No. 3,814,479 describes a truck's hopper without wear and tear plates, but the hopper is built with a plurality of extruded panels integrally reinforced with "T" beams, with the purpose of providing a hopper that is easily maintained and repaired, since said panels are easily removable once they have been damaged.

On the other hand, the Applicant's prior U.S. patent application Ser. No. 09/150,447 refers to a mining hopper for the transport of material that comprises a structure fitted by the hopper a such, integrally manufactured with a wear and tear steel, being by themselves, the floor, lateral and front wells, the only coating against abrasion; and a reinforcement structure conformed by a plurality of "T" beams arranged adjacent to the body, be it in longitudinal or transversal form, so as to provide structural support to the body, which is also manufactured solely of wear and tear material.

In U.S. Pat. No. 6,022,068, belonging to Caterpillar, Inc., a light body made for tumbling trucks is described that comprises a floor with two lateral and opposite walls that extend upwards in spaced form and fastened to the floor, and further includes a frontal wall that extends in an ascending manner and that is fastened to the floor between the lateral walls to create space for transporting a useful load, and a weir channel to the rear, for the tumbling of the useful load. The floor is formed by numerous sections adjacently arranged, that are separate pieces that form part of a continuous piece. The sections are arranged in a growing order of thickness or hardness, with the thicker or harder section located in the weir channel. This body structure substantially reduces weight, and at the same time, simultaneously maintains its force, which increases the useful load capacity of the tumbling truck.

In each of these described hoppers, the overall weight is increased due to the use of a number of structural beams used to reinforce each surface.

3. Solution to the Problem

In the present invention, the use of curved surfaces allows the substitution, and in some cases the elimination, of structural beams in the hopper, which allows a hopper of lower weight, that may transport a greater load without exceeding the maximum gross weight allowed. Further, said hopper can be produced at a lower cost, since it is not necessary to manufacture or install beams at the frontal zone and blinder of the hopper, and the number of beams manufactured and installed in the bottom may be reduced.

As an additional feature, said curved surfaces increase the resistance of the hopper to impact. This is due to the fact that the curved surfaces distribute in a uniform manner the strains generated by the impact of the materials during loading and unloading given the great elasticity of its structure, which avoids the concentration of strains that would damage the hopper.

Furthermore, the curved surfaces increase the discharge speeds of materials due to the non-existence of encounters with angles.

SUMMARY OF THE INVENTION

An object of the present invention is to provide a hopper for a mining truck that is capable of deforming itself elastically when it is subject to loading(s) or unloading(s) of material, preferably built of structural or wear and tear steel, where the hopper's structure is achieved using the curved effect of the envelopment of the construction material. The great moments of inertia that are achieved with curved surfaces eliminate or reduce to a great extent the use of beams as main resistance elements.

The protective blinder of the hopper is built mainly by an envelopment preferably cylindrical in shape, that sustains itself due to the moment of inertia that the cylindrical curvature of the envelopment of the construction material generates. This blinder preferably comprises at least one transversal beam that supports the curved shape of the material, and two lateral beams to keep the edges of the blinder straight.

The frontal wall of the hopper preferably comprises at least one sheet of curved construction material in a transversal direction, of preferably elliptical envelopment, which arrangement again generates a moment of inertia such that it is not necessary to use beams as main resistance elements.

The bottom of the hopper is built preferably with at least one sheet of material with a transversally curved construction, also of preferably elliptical envelopment, and externally supported by a plurality of curved transversal beams of "T" section or double "T" section, preferably five curved transversal beams considering the dimensions of the present-day hoppers, which have a main function to keep the curved surface of the sheet and to transfer the stresses of the envelopment of the bottom to the truck's chassis. The external structure of the hopper's bottom also possesses a plurality of supporting elements in the longitudinal direction, preferably two supporting elements, that are located in its front part, ahead of the rotation axis of the hopper, having as its only function to allow the support of the hopper on the truck's chassis. Said supporting elements may be eliminated if the truck's chassis is adapted to receive directly the base of the transversal beams. The rear part of the hopper's bottom, i.e., to the back of the rotation axis of the hopper, is supported by the moment of inertia of the curve, without any need for additional external longitudinal beams.

The form of the hopper, and arrangement of its construction materials, makes the same light, thus necessitating that it be very elastic to be able to absorb the energy of impact during loading and unloading. This is achieved by the curved forms (curved surfaces), which distribute the local strains generated by impact during loading and unloading, to the entire surface, thus avoiding strain concentrations. This feature of elasticity is present throughout the entire structure since the structure does not have beams that would restrict the elastic deformation capacity of the structure.

At the bottom of the hopper, which preferably has transversal beams and supporting elements in the longitudinal direction, the elasticity conditions, and especially the conditions to the moments of torsion, are achieved by the design of a sliding system at the crossing of the transversal beams with the supporting elements in the longitudinal direction. In this manner, the need of any type of fixed coupling has been avoided. For example, a welding type coupling between the transversal beams and the supporting elements in the longitudinal direction, which impedes the generation of strains of the coupling and allows a free motion between the beam and the supporting element, is not needed. The coupling between said transversal beams and the supporting elements in the longitudinal direction is then of the sliding crossing type, described above.

DETAILED DESCRIPTION

In conventional mining operations, when the loading or unloading of material is performed, the gradual wear and tear of the hopper takes place due to friction, abrasion and similar mechanical phenomena. In the hopper of the present invention, the materials and arrangement of the hopper have been employed to permit an increased elastic deformation and a high resistance to impact. Furthermore, by this invention, the hopper's weight is decreased and easy removal of the parts is permitted, once the wear and tear of the hopper has taken place.

Regarding the Figures, the mining hopper of the present invention that is designated with the numeral 1, is preferably built with structural or wear and tear steel, achieving the structure of the hopper by utilizing a curved form in the material of structural or wear and tear steel- i. e., the material is not arranged so as to generate flat surfaces, but instead curved surfaces.

Figure 1:
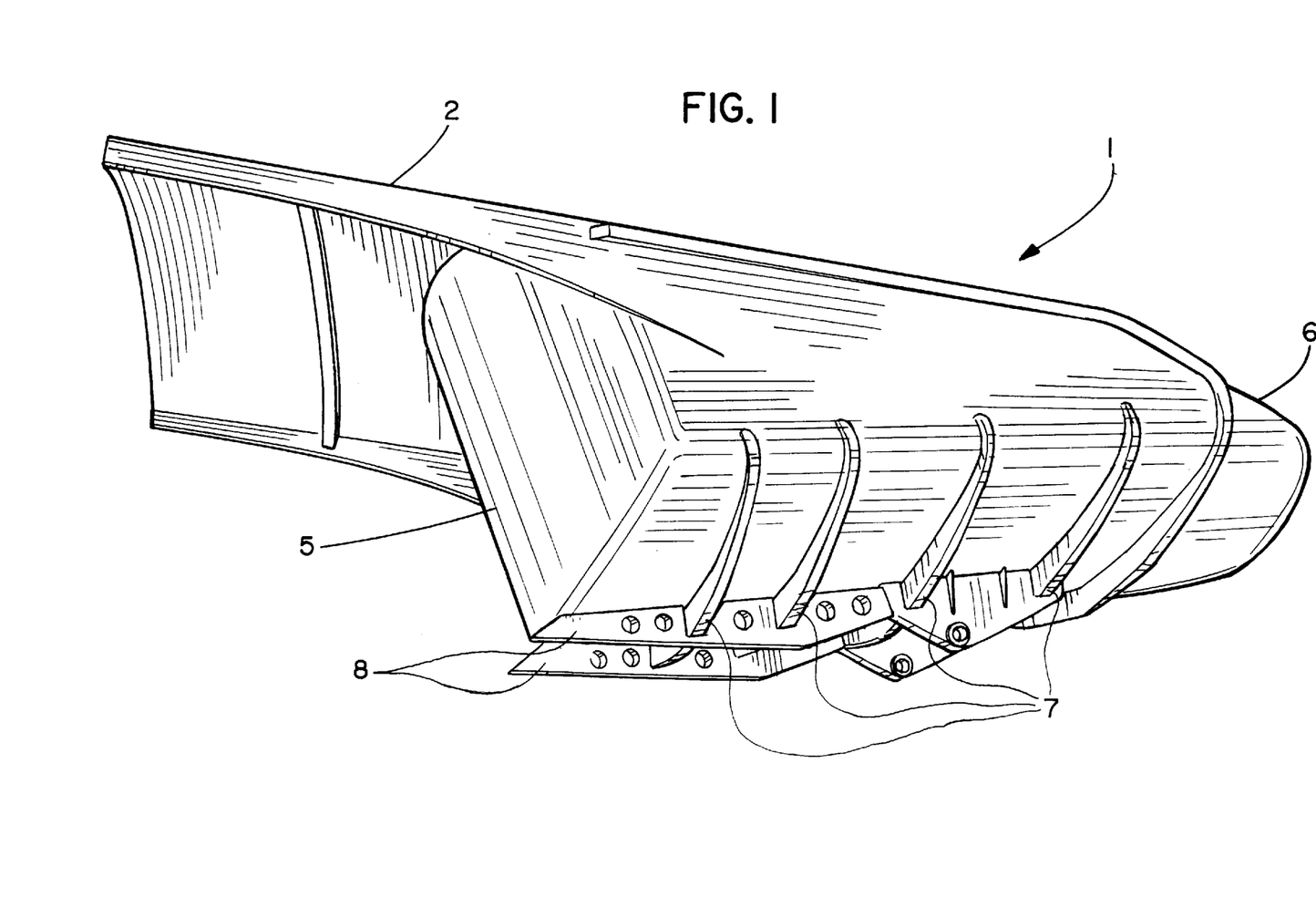
FIG. 1 shows a lower angle, perspective view of the hopper.
Figure 2:
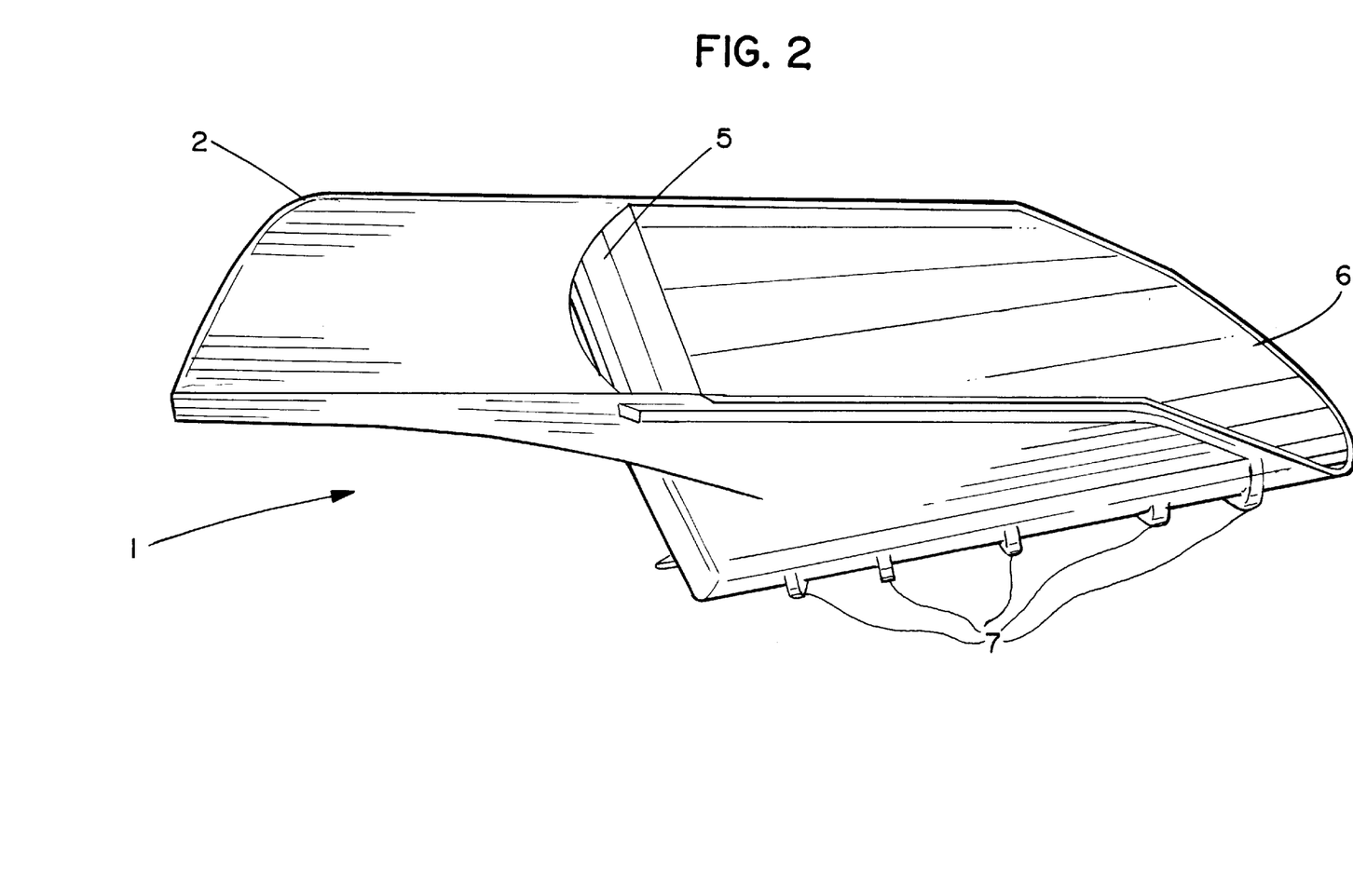
FIG. 2 shows an upper angle, perspective view of the hopper.
Figure 3:
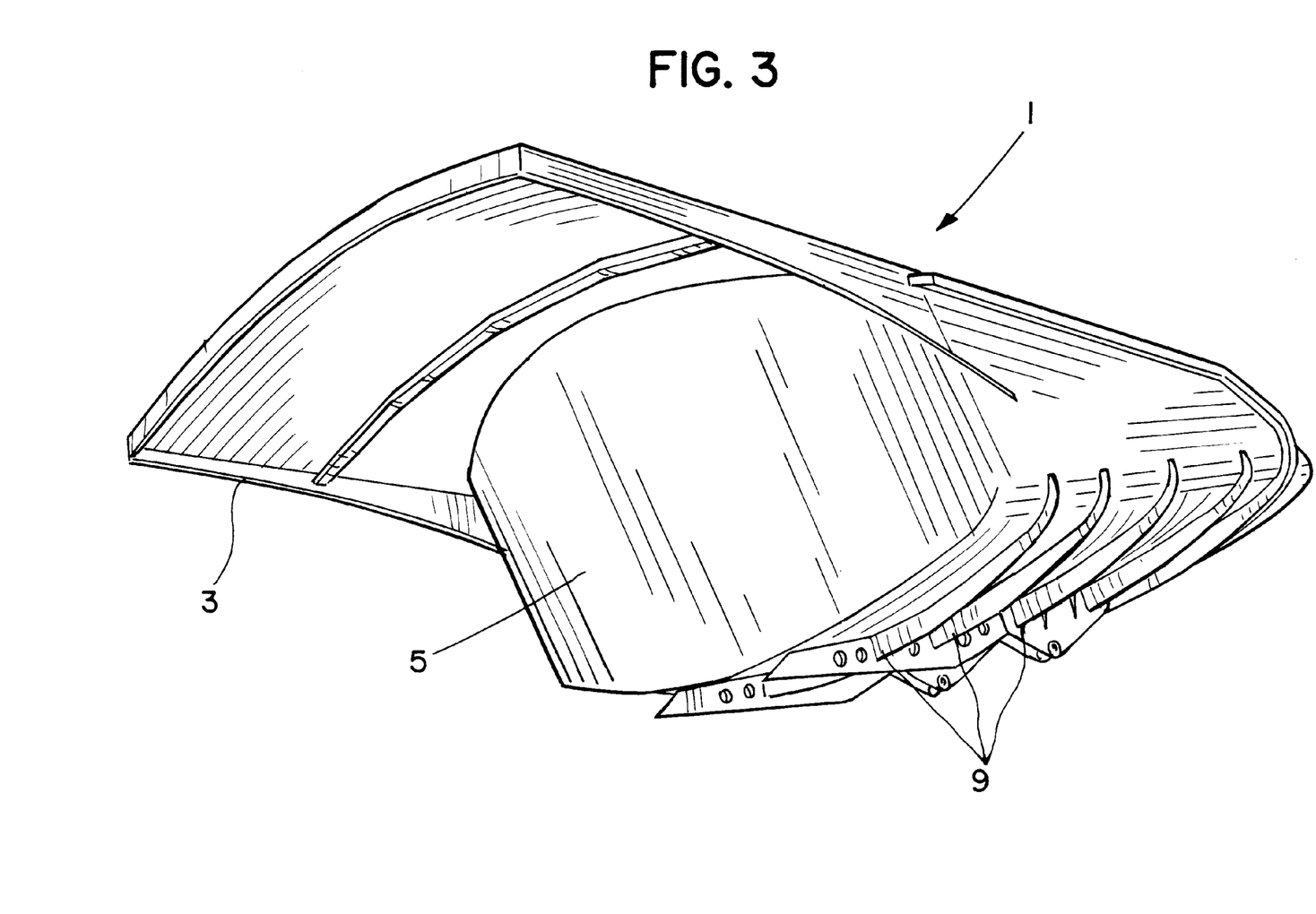
FIG. 3 shows a rear angle, perspective view of the hopper.
Figure 6:
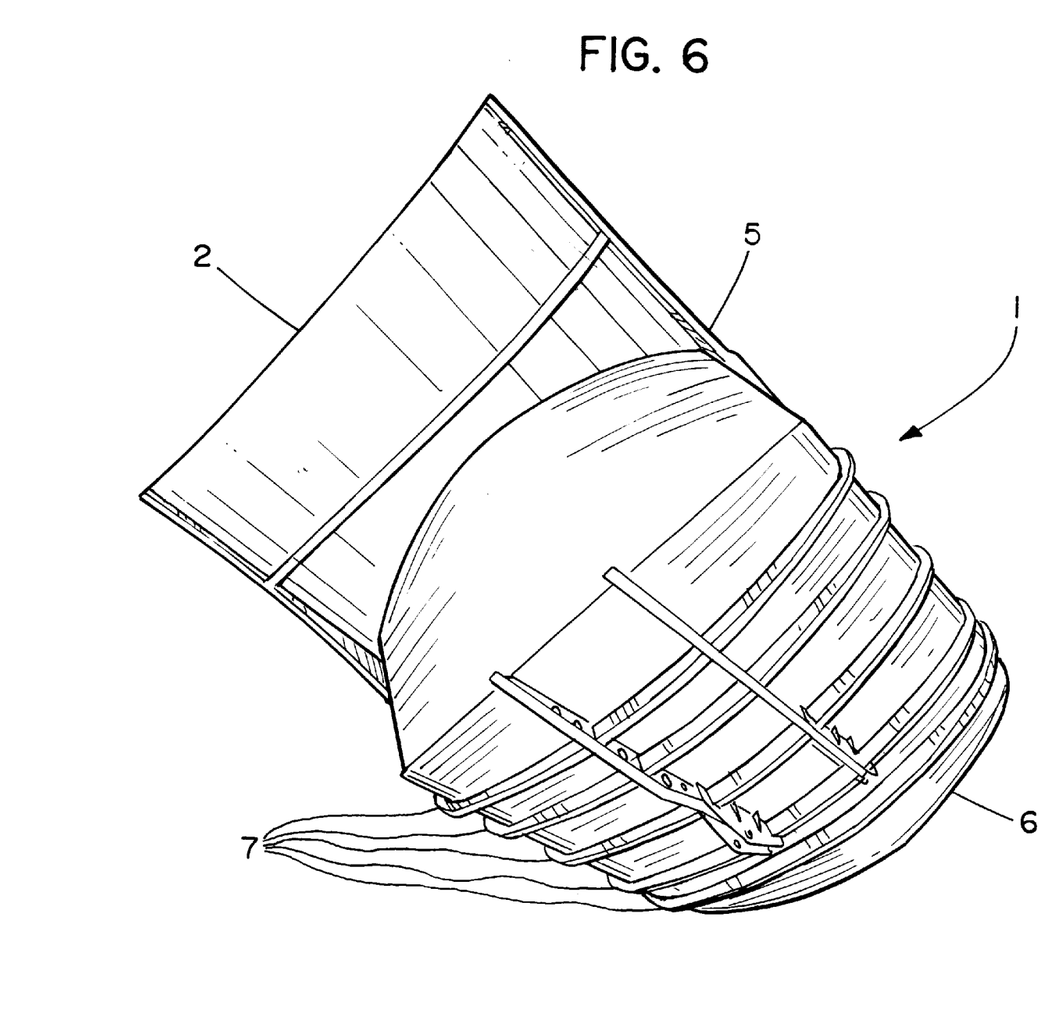
FIG. 6 shows a lower angle, perspective view of the hopper.

From FIGS. 1–3 and 6, it can be observed that preferably the protective blinder (2) of hopper (1) comprises a cover of preferably cylindrical envelopment, which sustains itself due to the moment of inertia that the cylindrical curvature of the same generates. This blinder (2) has at least one transversal beam (3), which functions to maintain the curved shape of the blinder, and two lateral beams (4) to keep the edges of the blinder straight. The transversal beam (3) is located preferably in the medium zone of the blinder (2).

Figure 4:
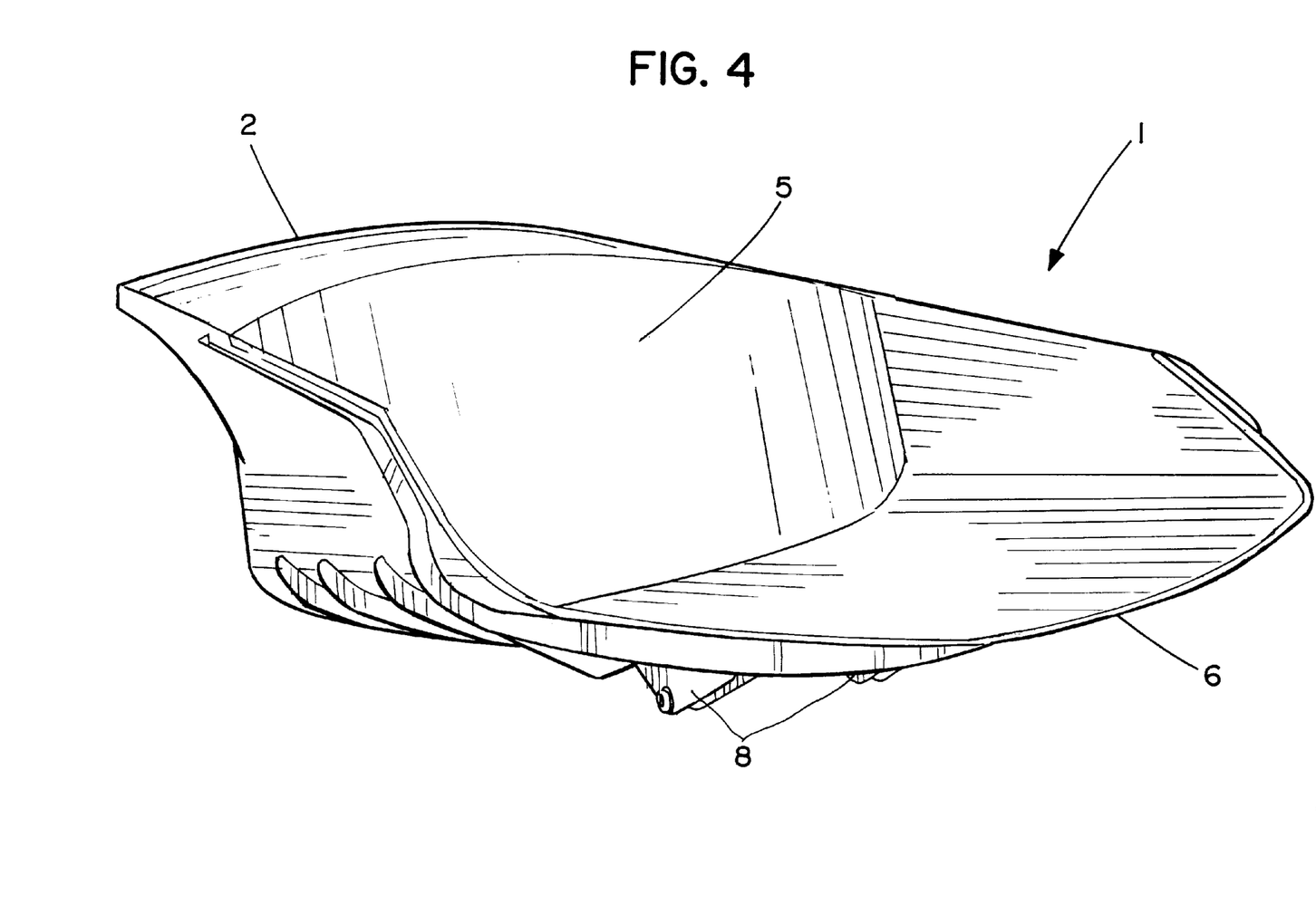
FIG. 4 shows a front angle, perspective view of the hopper.
Figure 8:
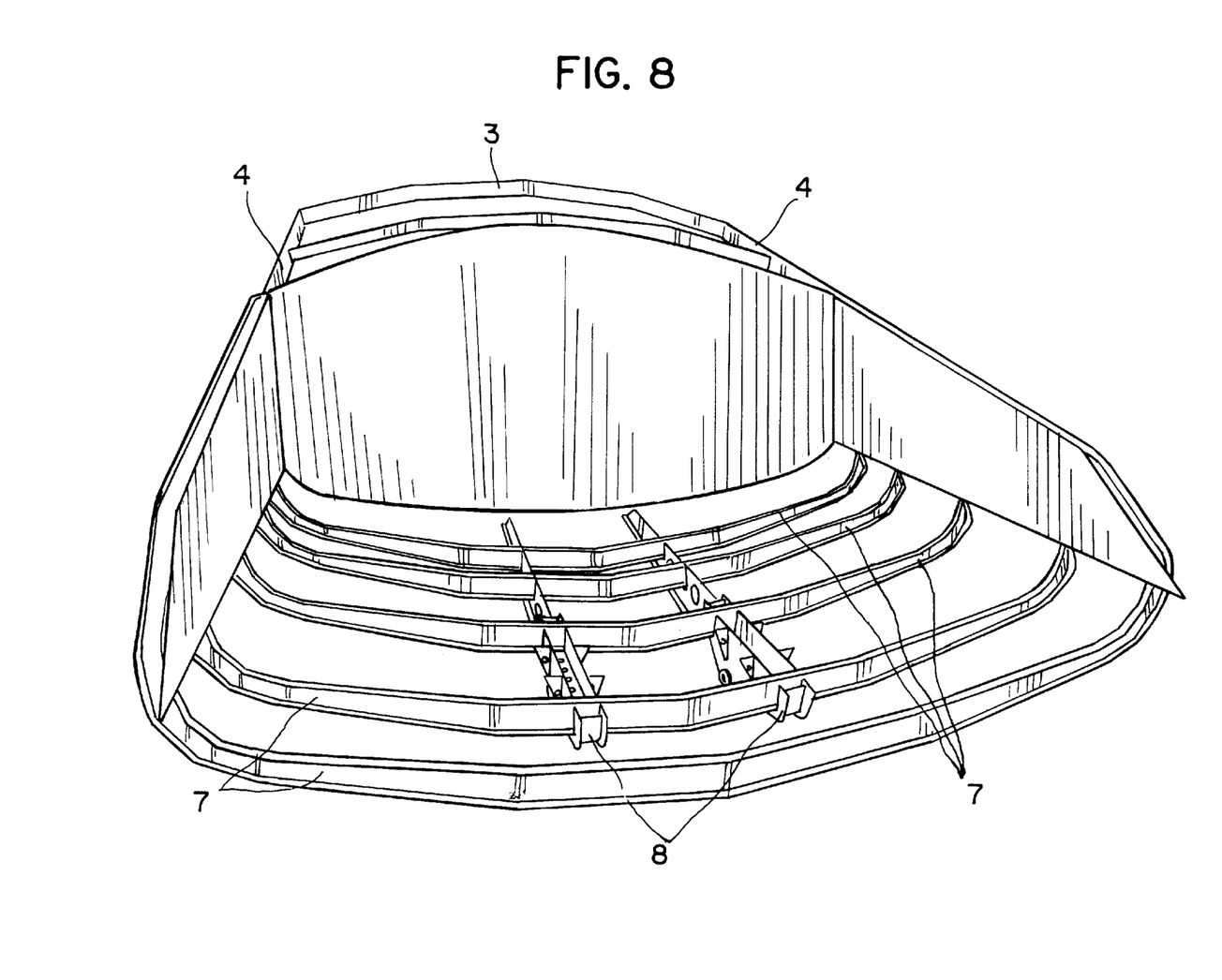
FIG. 8 shows a front perspective view of the hopper, where the curved structure of the bottom has been removed to observe in detail the curved transversal beams of "T" section or double "T" section, and the supporting elements in the longitudinal direction.
Figure 9:
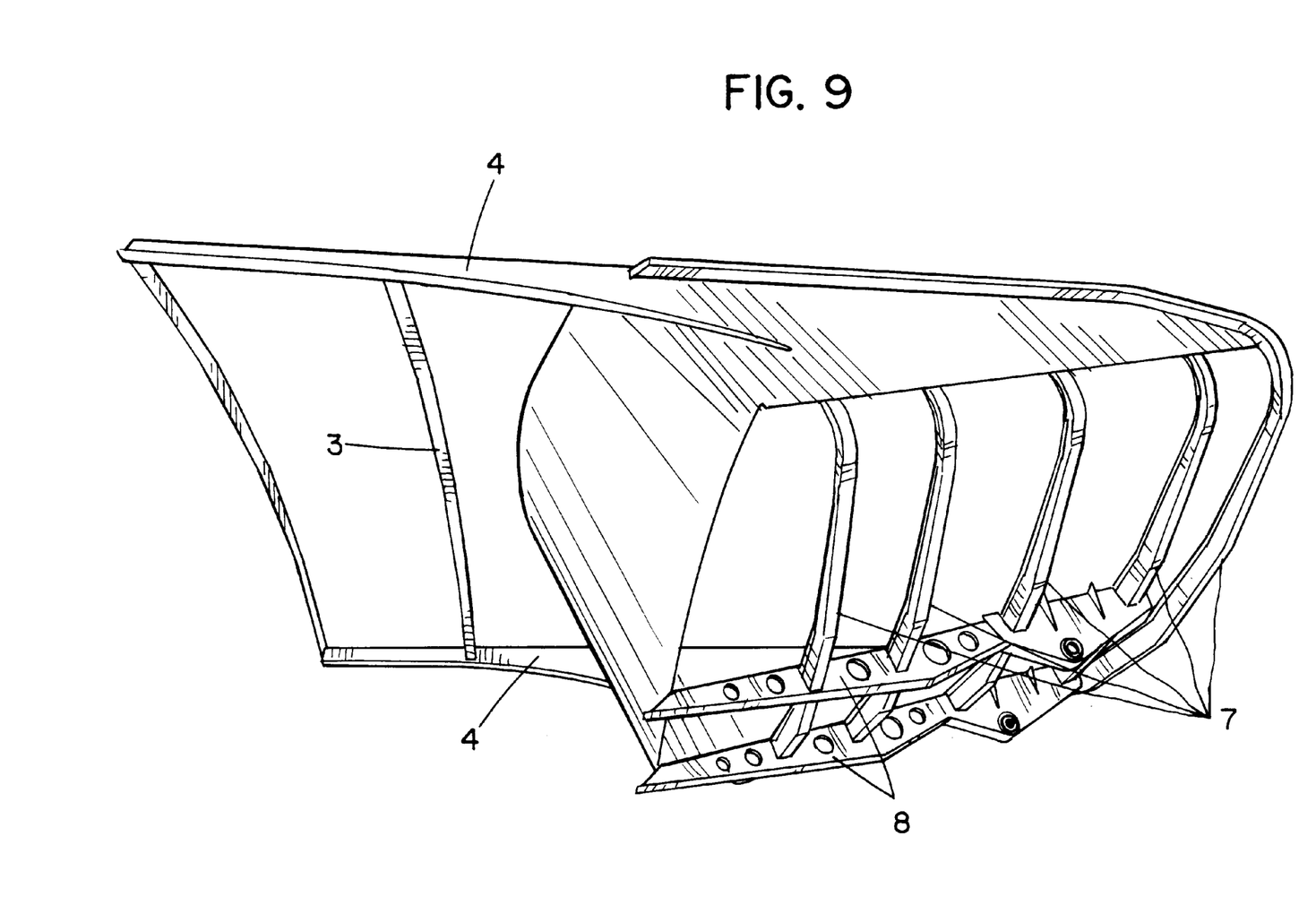
FIG. 9 shows a lower angle, perspective view of the present hopper, where the curved structure of the bottom and blinder have been removed to observe in detail the curved transversal beams of "T" section or double "T" section and the supporting elements in the longitudinal direction.
Figure 10:
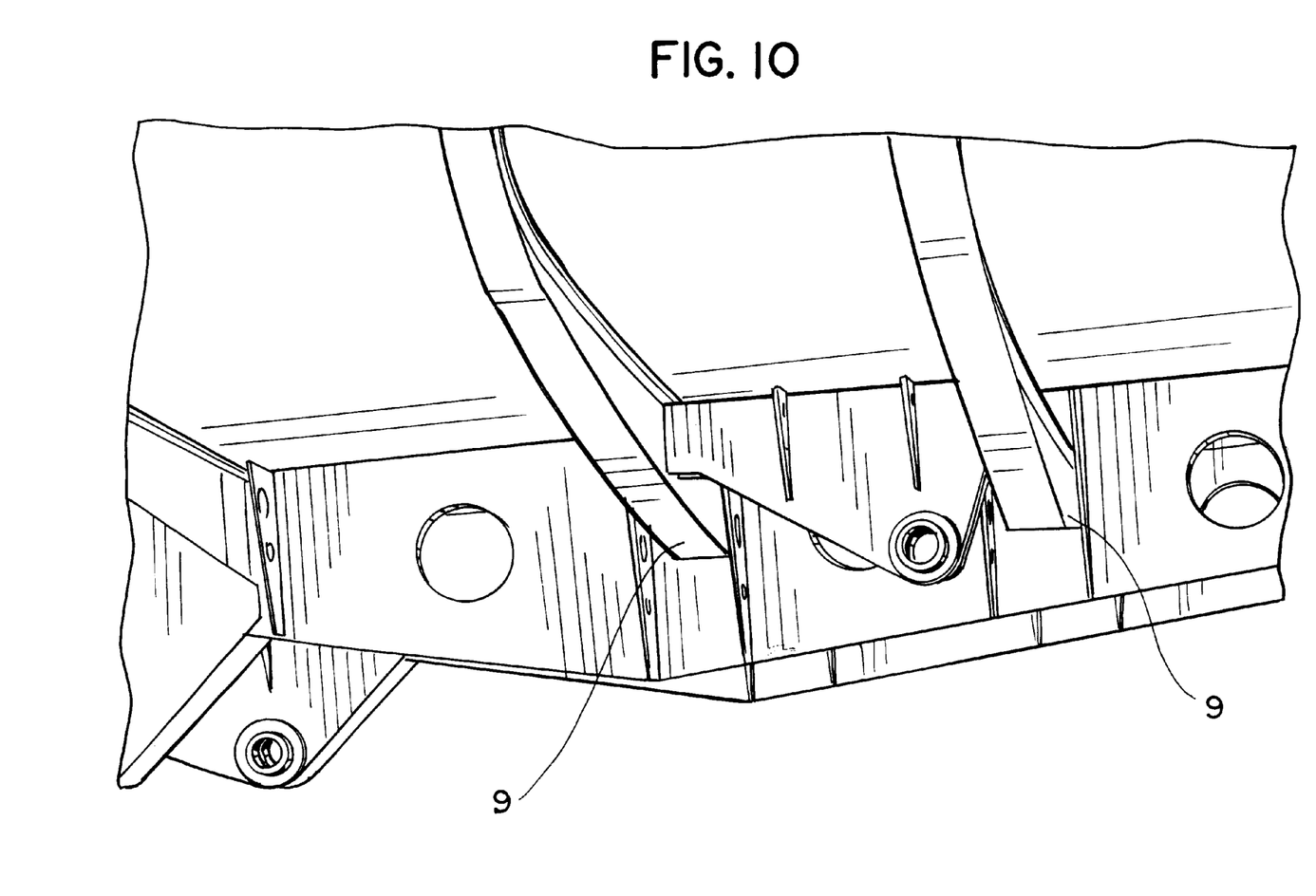
FIG. 10 shows a lower angle, perspective view of the hopper's bottom, where the sliding coupling between the longitudinal beam and the supporting element is shown in detail.

FIGS. 1–4, 6, 8 and 9, show that the frontal wall (5) of the hopper (1) preferably has at least one curved sheet in the transversal direction of envelopment, preferably elliptical while the bottom (6) of the hopper (1) has a series of transversally curved sheets of preferably elliptical envelopment, which are externally supported by a plurality of curved transversal beams, preferably only five curved transversal beams of "T" section or double "T" section (7), that are distributed equally in a longitudinal manner, which have the function of keeping the curved form of the wall and transferring the stresses of the envelopment of the bottom (6) to the chassis of the truck.

Figure 5:
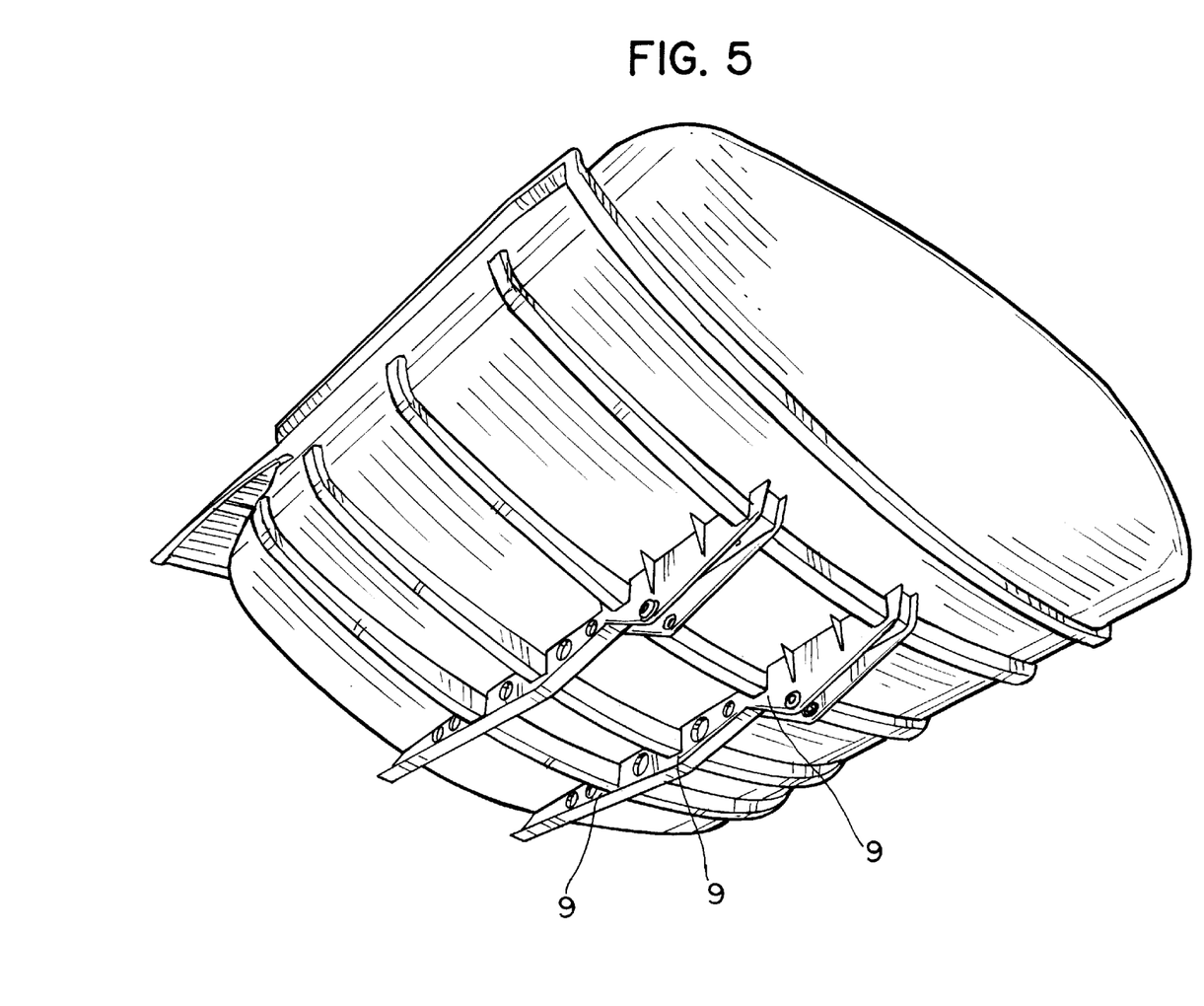
FIG. 5 shows a lower plan view of the hopper.
Figure 7:
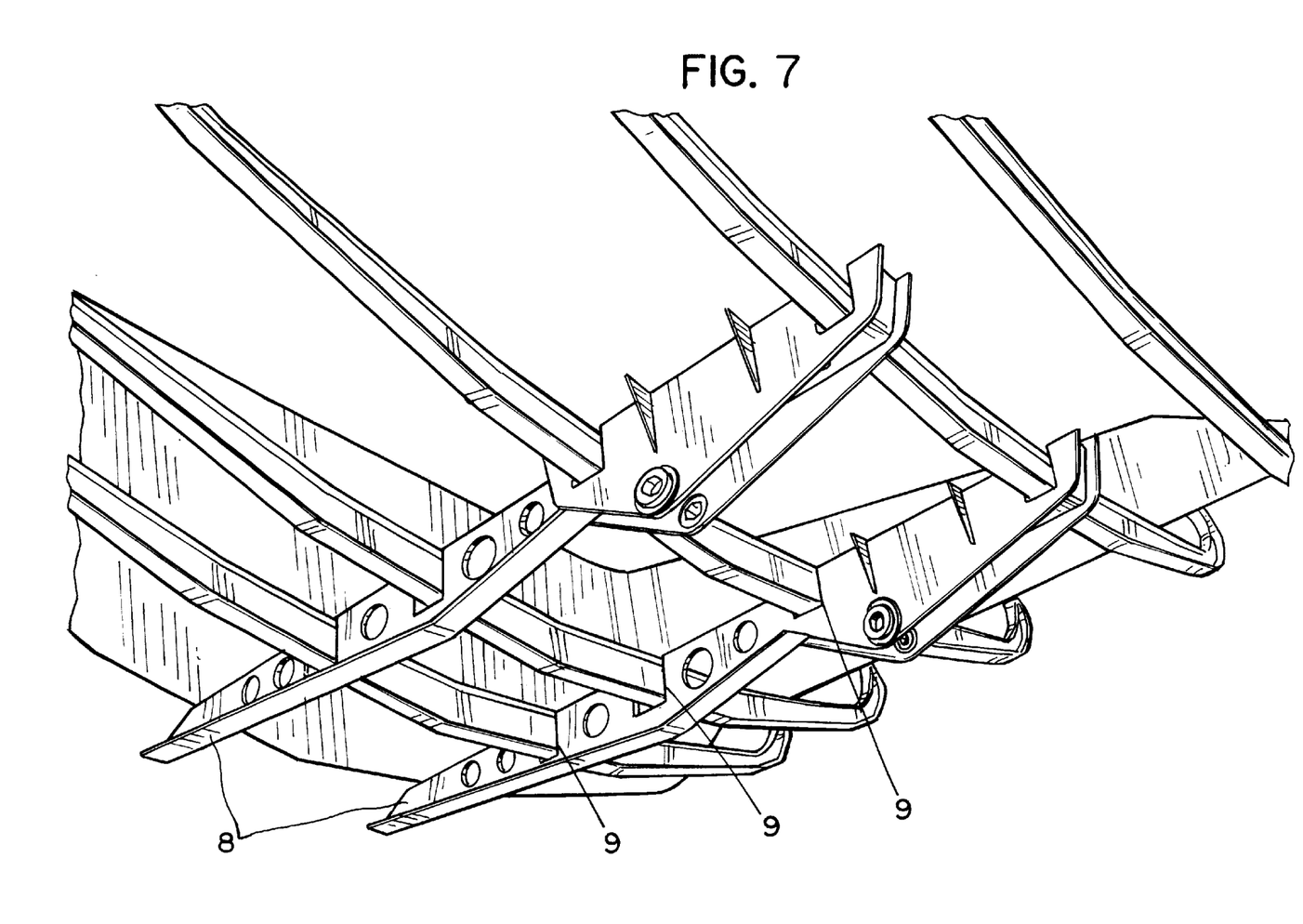
FIG. 7 shows a perspective view of the curved transversal beams of "T" section or double "T" section, and the supporting elements in the longitudinal direction of the hopper's bottom.

FIGS. 1, 3 and 5–9 show that the bottom (6) of the hopper (1) preferably possessing two supporting elements (8) at the front part, which are ahead of the rotation axis of the hopper (1), which have the only function of supporting the hopper on the truck's chassis. The rear part of the bottom does not have any longitudinal beams and supports itself by the moment of inertia of the bottom's own curve. The intersection of the transversal beams (7) and the supporting elements (8) does not show any welding between them, producing a coupling of the sliding type (9) between the same.

The present hopper (1) is joined to the chassis of a mining truck in mobile form, and moves between the transport position, where the position of the hopper is generally parallel to the chassis of the mining truck, and an extended tumbling position, where the front of the hopper is tilted upward and apart from the mining truck's chassis to permit tumbling of the useful load, by means of conventional mechanisms of coupling and hydraulic lifting.

Those skilled in the art will note that the variations the former description by modifying the number of curved transversal beams, supporting elements, construction material sheets, etc., seeking as an objective to adjust the size of the hopper according to the requirement of loading or unloading, are included within the present invention.

I claim:

1. An elastically deformable mining truck hopper comprising: a frontal wall, protective blinder, and bottom having curved surfaces, formed of construction materials capable of being formed in the shape of said curved surfaces; a plurality of curved transversal beams at the bottom; and at least one curved transversal beam and two lateral beams in the blinder.

2. A hopper according to claim 1, wherein the curved surface of the protective blinder is semi-cylindrically shaped and the curved surfaces of the frontal wall and bottom are semi-elliptically shaped.

3. A hopper according to claim 1, wherein the construction materials are wear and tear steel.

4. A hopper according to claim 1 having 5 curved transversal beams at the bottom of the hopper.

5. A hopper according to claim 1, further comprising supporting elements extending the hopper in a longitudinal direction that support the hopper to the chassis of the mining truck.

6. A hopper according to claim 5 having 2 of said supporting elements.

7. A hopper according to claim 5, wherein the bottom transversal beams and the supporting elements intersect at a coupling.

8. A hopper according to claim 7, wherein said coupling is a sliding type coupling which allows for the bottom transversal beams to slide freely through the supporting elements.

9. A hopper according to claim 1, wherein the bottom transversal beams are of "T" section or double "T" section.

10. A hopper according to claim 1, wherein the construction materials are structural steel.

* * * * *